UNITED STATES PATENT OFFICE.

JOSEPH A. BRADBURN, EDWARD N. TRUMP, AND JOHN D. PENNOCK, OF SYRACUSE, NEW YORK.

PROCESS OF PURIFYING WATER.

SPECIFICATION forming part of Letters Patent No. 466,709, dated January 5, 1892.

Application filed August 17, 1889. Serial No. 321,133. (Specimens.)

*To all whom it may concern:*

Be it known that we, JOSEPH A. BRADBURN, EDWARD N. TRUMP, and JOHN D. PENNOCK, of Syracuse, in the county of Onondaga and State of New York, have invented new and useful Improvements in Processes for Removing Scale-Producing Substances from Liquids, of which the following is a full, clear, and exact description.

Our invention relates to processes for the removal of scale-forming substances from brine, water, or other liquids, and to such removal by precipitation.

Our object is to do this by a simple, quick, and inexpensive process, thereby, for instance, rendering salt free from sulphates and carbonates when made from brine so treated.

Our invention consists in the novel process hereinafter described, and set forth in the claims annexed.

This process is founded upon the fact that when brine, water, or other liquids are treated with bicarbonate of barium in sufficient quantities the sulphates are precipitated.

We first test the brine, water, or other liquid to determine the quantity of sulphates in solution. We then treat it with bicarbonate of barium in sufficient quantities to precipitate the sulphates. We then heat the liquid or add milk of lime in sufficient quantities to precipitate the bicarbonates. We then remove the precipitate by any ordinary method.

What we claim as our invention, and desire to secure by Letters Patent, is—

1. The herein-described process of removing scale-forming substances from liquids, which consists in first treating the liquid with bicarbonate of barium for precipitating the sulphates, next precipitating the carbonates, and finally removing the precipitates from the liquid so treated, as herein set forth.

2. The herein-described process of removing scale-forming substances from liquids, which consists in first treating the liquid with bicarbonate of barium for precipitating the sulphates, next treating the liquid with milk of lime for precipitating the carbonates, and finally removing the precipitates from the liquid so treated, as herein set forth.

In testimony whereof we have hereunto set our hands this 10th day of August, 1889.

JOSEPH A. BRADBURN.
  EDWD. N. TRUMP.
  JOHN D. PENNOCK.

In presence of—
 C. W. SMITH,
 ROBT. CROASDALE.